United States Patent [19]
Adams et al.

[11] Patent Number: 5,130,276
[45] Date of Patent: Jul. 14, 1992

[54] METHOD OF FABRICATING SURFACE MICROMACHINED STRUCTURES

[75] Inventors: Victor J. Adams, Tempe; Ronald J. Gutteridge, Paradise Valley, both of Ariz.

[73] Assignee: Motorola Inc., Schaumburg, Ill.

[21] Appl. No.: 700,838

[22] Filed: May 16, 1991

[51] Int. Cl.⁵ ........................................... H01L 21/302
[52] U.S. Cl. ..................................... 437/225; 437/228; 437/238; 437/241; 437/927; 156/657; 148/DIG. 164
[58] Field of Search ............... 437/228, 225, 238, 515, 437/927, 241, 925; 148/DIG. 764; 156/657

[56] References Cited

U.S. PATENT DOCUMENTS

| | | | |
|---|---|---|---|
| 4,740,410 | 4/1988 | Muller et al. | 156/657 |
| 4,893,509 | 1/1990 | MacIver et al. | 156/657 |
| 4,901,570 | 2/1990 | Chang et al. | 73/517 AV |
| 4,948,757 | 8/1990 | Jain et al. | 437/238 |
| 5,043,043 | 8/1991 | Howe et al. | 156/657 |
| 5,059,556 | 10/1991 | Wilcoxen | 437/927 |
| 5,072,288 | 12/1991 | MacDonald et al. | 357/26 |

OTHER PUBLICATIONS

"Process Integration for Active Polysilicon Resonant Microstructures", Putty et al., Sensors and Actuators, 20 (1989), pp. 143-151.

"Investigations on Free-Standing Polysilicon Beams in View of Their Application as Transducers", Linder et al., Sensors and Actuators, A21-A23 (1990), pp. 1053-1059.

Primary Examiner—Brian E. Hearn
Assistant Examiner—Trung Dang
Attorney, Agent, or Firm—Miriam Jackson

[57] ABSTRACT

A method of fabricating a surface micromachined structure is comprised of the steps of providing a semiconductor substrate having a dynamic element partially supported above the semiconductor substrate by a release layer and having a metal contact layer disposed on the dynamic element, forming a protection layer over the metal contact layer, and removing the release layer and the protection layer with an etchant that etches the protection layer at a slower rate than the release layer.

20 Claims, 1 Drawing Sheet

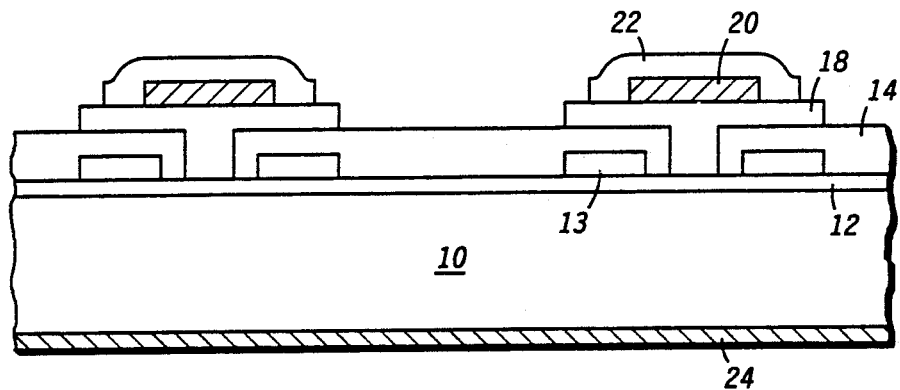
FIG. 1
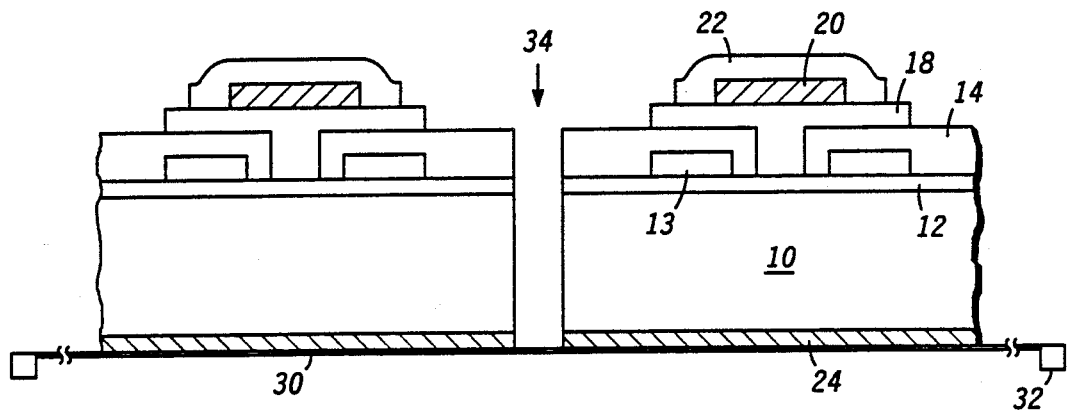
FIG. 2
FIG. 3
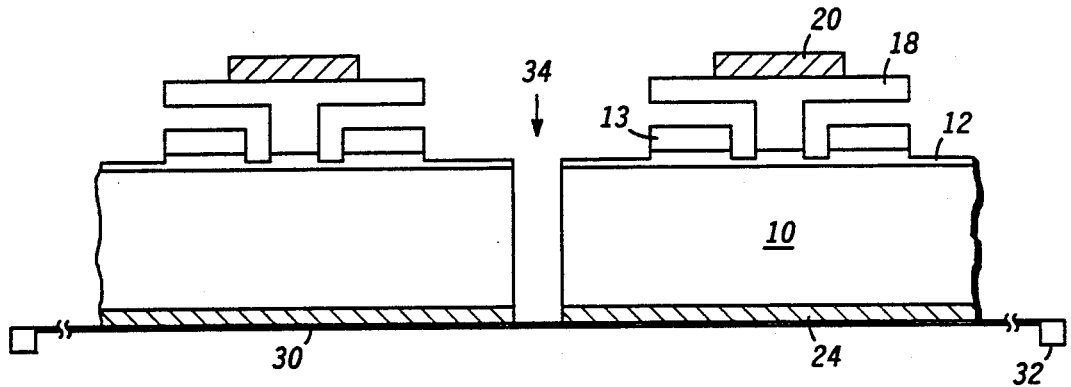

METHOD OF FABRICATING SURFACE MICROMACHINED STRUCTURES

BACKGROUND OF THE INVENTION

This invention relates, in general, to surface micromachined structures, and more particularly, to a method of fabricating surface micromachined structures.

Surface micromachined structures are used for a wide variety of applications, including accelerometers and other actuators and sensors. These micromachined structures are fabricated by depositing and patterning a sacrificial or release layer on a substrate, depositing and patterning a polysilicon film to form a dynamic element, forming a metal contact to the dynamic element, and removing the release layer to leave the dynamic element partially supported or free standing above the substrate surface.

After the release layer has been removed, the dynamic element is fragile and can be damaged by further processing. Therefore, it is desirable to remove the release layer at the end of the processing. However, if the metal contact layer is comprised of aluminum, a photoresist layer has been used to protect the metal contact during removal of the release layer. Using a photoresist layer is disadvantageous because the photoresist layer must be removed by a solvent after the dynamic element is released and fragile. Photoresist removal also involves a cleaning step in which the substrate must be spin dried. Damage to the dynamic element will more than likely result at this time.

To solve the above problem, a metal contact layer comprised of gold rather than aluminum has been used, because gold is compatible with the etchant used to remove the release layer, and does not require protection. The use of gold, however, is undesirable because it is not the standard metal used in semiconductor fabrication, and it is more expensive than aluminum.

In the past, separation of individual die has been done after processing of the device is complete. Separation of individual die is accomplished by a sawing operation. Saw vibration can cause damage to the fragile micromachined structures after the release layer has been removed. There are also contamination problems that result from debris produced during the saw operation. It would be desirable to prevent these contamination and damage problems.

SUMMARY OF THE INVENTION

A method of fabricating a surface micromachined structure is comprised of the steps of providing a semiconductor substrate having a dynamic element partially supported above the semiconductor substrate by a release layer and having a metal contact layer disposed on the dynamic element, forming a protection layer over the metal contact layer, and removing the release layer and the protection layer with an etchant that etches the protection layer at a slower rate than the release layer.

BRIEF DESCRIPTION OF THE DRAWINGS

FIG. 1 illustrates an enlarged, cross-sectional views of an embodiment of the present invention in a beginning stage of fabrication;

FIG. 2 illustrates an enlarged, cross-sectional views of an embodiment of the present invention in a further stage of fabrication; and FIG. 3 illustrates an enlarged, cross-sectional views of an embodiment of the present invention in yet a further stage of fabrication.

DETAILED DESCRIPTION OF THE DRAWINGS

FIG. 1 illustrates an enlarged, cross-sectional view of an embodiment of the present invention in a beginning stage of fabrication. The fabrication of a capacitive accelerometer will be described, however, the present invention is applicable in the processing of other surface micromachined structures as well as surface micro machined structures integrated with other circuits on the same substrate. Standard semiconductor processing is used to fabricate the various layers, unless otherwise noted. The layers are not drawn to scale. What is shown in FIG. 1 is a semiconductor substrate 10, preferably comprised of either P or N-type silicon.

On substrate 10, an insulating layer 12 is formed. Insulating layer 12 is preferably comprised of a material and a thickness which will protect substrate 10 from being etched later in the process. In a preferred embodiment, insulating layer 12 is comprised of a silicon nitride or oxynitride layer, and more preferably a low pressure chemical vapor deposited (LPCVD) silicon nitride, having a thickness of approximately 2000 Angstroms.

After the formation of insulating layer 12, a conductive or semiconductive layer 13 is formed and patterned on insulating layer 12. Conductive or semiconductive layer 13 acts as the first plate of the capacitor of this capacitive accelerometer. The formation of layer 13 is optional, in that substrate 12 can be used as the first plate of the capacitor. The thickness of layer 13 typically ranges from 2,000 to 10,000 Angstroms.

Next, a release layer 14 is formed and patterned on layer 13 and insulating layer 12. Release layer 14 is preferably comprised of silicon dioxide, and more preferably an oxide which is fast etching, such as a phosphorus doped glass (PSG). The thickness of release layer 14 is determined by design considerations of the capacitor, and can typically be on the order of approximately 20,000 Angstroms.

Subsequently, a dynamic element 18 is formed and patterned on release layer 14 and on insulating layer 12. Dynamic element 18 can take on various formations, such as a cantilever, a bridge or other structure having a portion free standing or supported above substrate 10 or layer 13. At this time, dynamic element 18 is supported by release layer 14, so it is not "dynamic" yet. Dynamic element 18 acts as the second plate of the capacitor, thus it must be formed out of a conductive or semiconductive material. Dynamic element 18 must also have suitable mechanical properties such that it can be partially free standing above substrate 10. In a preferred embodiment, dynamic element 18 is comprised of doped polysilicon. The thickness of dynamic element 18 is typically approximately 20,000 Angstroms, however other suitable thicknesses may be used.

A metal contact layer 20 is then formed and patterned to make electrical contact to at least dynamic element 18. In a preferred embodiment, metal contact layer 20 is comprised of aluminum. Aluminum is preferred because it is widely used in semiconductor processing. Of course other metals may be suitable for contacting dynamic element 18.

A protective layer 22 is then formed and patterned over metal contact layer 20. Protective layer 22 is comprised of a layer which is etched more slowly than release layer 14 by a release layer etchant and is a layer which can be formed at a low temperature where metal contact layer 20 is not deteriorated. If metal contact layer 20 is comprised of aluminum, then it is preferable that protective layer 22 be comprised of a plasma enhanced chemical vapor deposited (PECVD) silicon nitride layer, because it can be deposited at a low temperature. Other materials, such as LPCVD silicon nitride, or a PECVD silicon oxynitride may also be suitable. In fact, if release layer 14 is comprised of a PSG, it may be possible that protective layer 22 can be comprised of silicon dioxide when geometric design allows for short etch times of release layer 14, because silicon dioxide is etched more slowly than PSG in suitable etchants. The thickness of protective layer 22 will depend on such things as the type of release layer etchant used (or the etch rates of protective layer 22 and release layer 14), the thickness of release layer 14, and the amount of undercut necessary to remove all of release layer 14 from under dynamic element 18.

Substrate 10 is then typically ground to a suitable thickness and a back metal layer 24 may be formed on the backside of substrate 10 to provide for electrical contact to the back side of substrate 10. Back metal layer 24 is typically comprised of a titanium-nickel-silver combination. The back grind and back metal processes are well known in the art.

FIG. 2 illustrates the structure of FIG. 1 further along in processing. Substrate 10 is mounted on an adhesive backing 30. Adhesive backing 30 is preferably a mylar diaphragm, which is supported by a ring 32. After mounting, substrate 10 is separated into individual die. This separation is typically accomplished by sawing a moat 34 through substrate 10. Other methods of separation can be used. After separation, the individual die of substrate 10 are cleaned to remove the debris created from sawing through substrate 10. Each individual die remains on adhesive backing 30. In the present invention, dynamic element 18 is still supported by release layer 14 during the saw operation. Therefore, this step can be performed without damaging dynamic element 18.

FIG. 3 illustrates the structure of FIG. 1 further along in processing. After the sawing operation, release layer 14 is now removed by a release layer etchant. In a preferred embodiment, the release layer etchant is comprised of a hydrofluoric acid (HF) or a buffered HF solution. This type of etch is typically performed at 35° C. Other etchants may be used as long as both release layer 14 and protection layer 22 are removed at the end of the etching. In a preferred embodiment, protection layer 22 is comprised of a PECVD silicon nitride and release layer 14 is comprised of PSG as the preferred embodiment has been described above, both layers will be removed at approximately the same time after a suitable etch time. For example, when release layer is comprised of PSG having a thickness of approximately 20,000 Angstroms, an etch time of approximately 40 minutes provides an undercut of release layer 14 of approximately 50 microns, which is sufficient to release dynamic element 18. Slight overetch of either layer may be necessary. Preferably, however, both layers will be removed almost simultaneously. In this manner, metal contact layer 20 is protected from the release layer etchant. Back metal layer 24 is protected during the etch by adhesive backing 30. Slight etching of insulating layer 12 also takes place, however, if insulating layer 12 is comprised of a LPCVD silicon nitride, removal of this layer is slight because it is etched at a slower rate than PSG and PECVD silicon nitride.

A method for fabricating a surface micromachined structure has been described. This method provides for the dynamic element to be released at the end of the processing cycle, including the saw operation. Therefore, damage to the dynamic element is prevented. In addition, the metal layer contacting the dynamic element may be comprised of aluminum instead of gold, because it is protected during the removal of the release layer.

We claim:

1. A method of fabricating a surface micromachined structure comprising the steps of:
   providing a semiconductor substrate having a dynamic element partially supported above the semiconductor substrate by a release layer, and having a metal contact layer disposed on the dynamic element;
   forming a protection layer over the metal contact layer; and
   removing the release layer and the protection layer with an etchant that etches the protection layer at a slower rate than the release layer.

2. The method of claim 1 wherein the protection layer and the release layer are removed at approximately the same time.

3. The method of claim 1 wherein the step of forming a protection layer includes forming a protection layer comprised of plasma enhanced silicon oxynitride.

4. The method of claim 1 wherein the step of providing a semiconductor substrate includes the release layer being comprised of phosphorus doped glass.

5. The method of claim 1 wherein the step of forming a protection layer includes forming a protection layer comprised of plasma enhanced silicon nitride.

6. The method of claim 1 wherein the step of removing the release layer includes the etchant being comprised of a hydrofluoric acid solution.

7. The method of claim 1 further comprising the steps of:
   placing the substrate on an adhesive backing after forming the protection layer; and
   separating individual die on the substrate before removing the release layer.

8. A method of fabricating a surface micromachined structure comprising the steps of:
   providing a semiconductor substrate having a dynamic element comprised of polysilicon partially supported above the semiconductor substrate by a release layer comprised of silicon dioxide, and having a metal contact layer comprised of aluminum disposed on the dynamic element;
   forming a protection layer over the metal contact layer; and
   removing the release layer and the protection layer with an etchant that etches the protection layer at a slower rate than the release layer.

9. The method of claim 8 wherein the protection layer and the release layer are removed at approximately the same time.

10. The method of claim 8 wherein the step of forming a protection layer includes forming a protection layer comprised of plasma enhanced silicon oxynitride.

11. The method of claim 8 wherein the step of providing a semiconductor substrate includes the release layer being comprised of phosphorus doped glass.

12. The method of claim 8 wherein the step of forming a protection layer includes forming a protection layer comprised of plasma enhanced silicon nitride.

13. The method of claim 8 wherein the step of removing the release layer includes the etchant being comprised of a hydrofluoric acid solution.

14. The method of claim 8 further comprising the steps of:

placing the substrate on an adhesive backing after forming the protection layer; and separating individual die on the substrate before removing the release layer.

15. A method of fabricating a surface micromachined structure comprising the steps of:

providing a semiconductor substrate having a dynamic element partially supported above the semiconductor substrate by a release layer, and having a metal contact layer disposed on the dynamic element;

forming a protection layer over the metal contact layer; and removing the release layer and the protection layer with an etchant that removes the release layer and the protection layer at approximately the same time.

16. The method of claim 15 wherein the protection layer is removed at a slower rate than the release layer.

17. The method of claim 15 wherein the step of forming a protection layer includes forming a protection layer comprised of plasma enhanced silicon oxynitride.

18. The method of claim 15 wherein the step of providing a semiconductor substrate includes the release layer being comprised of phosphorus doped glass.

19. The method of claim 15 wherein the step of forming a protection layer includes forming a protection layer comprised of plasma enhanced silicon nitride.

20. The method of claim 15 further comprising the steps of:

placing the substrate on an adhesive backing after forming the protection layer; and sawing the substrate to separate individual die on the substrate before removing the release layer.

* * * * *